US008954396B2

(12) United States Patent
Leonard et al.

(10) Patent No.: US 8,954,396 B2
(45) Date of Patent: Feb. 10, 2015

(54) VALIDATING AND ENABLING VALIDATION OF PACKAGE STRUCTURES

(75) Inventors: Arthur C. Leonard, Redmond, WA (US); Andrey Shur, Redmond, WA (US); Kevin J. Boske, Seattle, WA (US); Igor Belianski, Issaquah, WA (US); Jerry J. Dunietz, Seattle, WA (US); Oliver H. Foehr, Mercer Island, WA (US); Young Gah Kim, Bothell, WA (US); Jesse D. McGatha, Sammamish, WA (US); Joshua M. Pollock, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 890 days.

(21) Appl. No.: 11/558,857

(22) Filed: Nov. 10, 2006

(65) Prior Publication Data

US 2008/0114813 A1 May 15, 2008

(51) Int. Cl.
*G06F 17/30* (2006.01)
*G06F 17/22* (2006.01)
*G06F 17/27* (2006.01)

(52) U.S. Cl.
CPC ........ *G06F 17/2247* (2013.01); *G06F 17/2705* (2013.01)
USPC ....................................................... 707/687

(58) Field of Classification Search
USPC ....................................................... 707/687
See application file for complete search history.

(56) References Cited

U.S. PATENT DOCUMENTS

| | | | |
|---|---|---|---|
| 6,957,256 B1 * | 10/2005 | Bradley et al. | 709/223 |
| 6,996,571 B2 | 2/2006 | McConnell | |
| 6,996,589 B1 | 2/2006 | Jayaram et al. | |
| 7,003,722 B2 | 2/2006 | Rothchiller et al. | |
| 7,036,073 B2 | 4/2006 | Jones et al. | |
| 7,055,093 B2 | 5/2006 | Tozawa et al. | |
| 7,206,646 B2 * | 4/2007 | Nixon et al. | 700/83 |
| 2002/0029304 A1 | 3/2002 | Reynar et al. | |
| 2004/0073870 A1 | 4/2004 | Fuh et al. | |
| 2004/0244006 A1 * | 12/2004 | Kaufman et al. | 718/105 |
| 2005/0007249 A1 * | 1/2005 | Eryurek et al. | 340/511 |
| 2005/0060317 A1 | 3/2005 | Lott et al. | |
| 2005/0177543 A1 | 8/2005 | Chen et al. | |
| 2005/0262115 A1 | 11/2005 | Hu et al. | |
| 2005/0278272 A1 * | 12/2005 | Ornstein et al. | 707/1 |
| 2006/0031233 A1 | 2/2006 | Liu et al. | |
| 2006/0053181 A1 * | 3/2006 | Anand et al. | 707/204 |
| 2006/0173865 A1 * | 8/2006 | Fong | 707/100 |

(Continued)

OTHER PUBLICATIONS

"Open Packaging Convention." Wikipedia, The Free Encyclopedia. Jul. 5, 2008, 21:25 UTC. Wikimedia Foundation, Inc. Jul. 31, 2008 <http://en.wikipedia.org/w/index.php?title=Open_Packaging_Convention&oldid=223797883>.*

(Continued)

*Primary Examiner* — James Trujillo
*Assistant Examiner* — Kurt Mueller
(74) *Attorney, Agent, or Firm* — John Jardine; Kate Drakos; Micky Minhas (57) ABSTRACT

This document describes tools capable of validating and enabling validation of a package's structure. To do so, constraint grammar is provided that is capable of enabling a person to build a set of machine-readable constraints for a package's structure. Based on this set of constraints, a package validator module may accurately and automatically validate that a package's structure meets these constraints.

20 Claims, 7 Drawing Sheets

(56) References Cited

U.S. PATENT DOCUMENTS

| | | | |
|---|---|---|---|
| 2007/0165260 A1* | 7/2007 | Fransazov | 358/1.13 |
| 2007/0168264 A1* | 7/2007 | Slone et al. | 705/28 |
| 2007/0234280 A1* | 10/2007 | Suenbuel | 717/104 |
| 2008/0114768 A1* | 5/2008 | Sadovsky et al. | 707/9 |
| 2008/0114872 A1* | 5/2008 | Fisher et al. | 709/224 |
| 2008/0115055 A1* | 5/2008 | Sadovsky et al. | 715/255 |
| 2008/0125877 A1* | 5/2008 | Miller et al. | 700/29 |

OTHER PUBLICATIONS

Ecma International, Part 2 of the Ecma Office Open XML standard—Ecma 376 (Office Open XML—Part 2 : Open Packaging Conventions), Dec. 2006, <http://www.ecma-international.org/publications/standards/Ecma-376.htm>.*

Marinelli, et al., "SchemaPath, a Minimal Extension to XML Schema for Conditional Constraints", retrieved at <<http://citeseer.ist.psu.edu/cache/papers/cs2/24/http:zSzzSzwww.www2004.orgzSzproceedingszSzdocszSz1p164.pdf/marinelli04schemapath.pdf>>, WWW 2004, May 14-22, 2004, ACM, pp. 164-174.

Sperberg, "XML Schema 1.0: A Language for Document Grammars", retrieved at <<http://www.idealliance.org/papers/dx_xml03/papers/04-01-04/04-01-04.pdf>>, Proceedings by DeepX Ltd., Render X, pp. 1-07.

Thompson, et al., "XML Schema Part 1: Structures Second Edition" retrieved on Aug. 25, 2006, at <<http://www.w3org/TR/xmlschema-1>>,W3C Recommendation Oct. 28, 2004, W3C, 2004.

Sperberg, "XML Schema 1.0: A Language for Document Grammars", retrieved at <<http://www.idealliance.org/papers/dx_xml03/papers/04-01-04/04-01-04.pdf>>, Proceedings by DeepX Ltd., Render X, Dec. 10, 2003, pp. 1-07.

* cited by examiner

VALIDATING AND ENABLING VALIDATION OF PACKAGE STRUCTURES

BACKGROUND

Some computing applications consume files conforming to the Open Packaging Convention. These files, often called "packages," may enable these applications to open particular documents, such as a particular word-processing application consuming a particular package to open a particular word-processing document.

Each of these computing applications may require its packages to have a particular package structure in addition to conforming to the Open Packaging Convention (OPC). An instance of a package that does not conform to a computing application's needed structure may cause the application to fail in some way. For example, if a spreadsheet application attempts to open a particular spreadsheet document by consuming a package that does not conform to that spreadsheet application's required structure, the application may not be able to open the document or may encounter some other problem.

To address this issue, package drafters may refer to a human-readable specification of the structure needed by a computing application for which they intend to build packages. The drafters may then build each package based on the human-readable specification in an attempt to enable the computing application to consume each package without failure. Drafters, however, may fail to correctly structure packages.

A drafter may attempt to find structural failures in a package by consuming the package with the appropriate computing application in the hope that if the package does not have the proper structure it will fail in a discernable manner. If it does, the drafter may then attempt to determine the cause of the failure and address it. But consuming packages in the hope that by trial-and-error a structural defect may cause a discernable failure is both time consuming and unreliable. When this trial-and-error process fails to find an existing structural defect, packages having this structural defect may be distributed to users and cause extensive downstream problems.

SUMMARY

This document describes tools capable of validating and enabling validation of a package's structure. To do so, constraint grammar is provided that is capable of enabling a person to build a set of machine-readable constraints for a package's structure. Based on this set of constraints, a package validator module may accurately and automatically validate that a package's structure meets these constraints.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The same numbers are used throughout the disclosure and figures to reference like components and features.

DETAILED DESCRIPTION

Overview

The following document describes tools capable of validating and/or enabling validation of a package's structure. The tools may do so, in some embodiments, by providing constraint grammar enabling someone to build a set of machine-readable constraints for an OPC package's structure. Based on this set of constraints, the tools may validate that a package's structure meets these constraints. By so doing, the tools may enable package drafters to forgo some time-consuming and unreliable processes for finding structural inconsistencies in OPC packages. The tools may also enable validation of OPC packages for additional structural limitations, such as indicating that an OPC package for a word-processing document contains embedded macros or some other aspect that someone would like to detect.

An environment in which the tools may enable these and other actions is set forth below in a section entitled Exemplary Operating Environment. This section is followed by sections entitled Exemplary Constraint Grammar, Drafting Constraints, and Validating OPC Packages, which describe exemplary embodiments of the tools in the context of eXtensible Markup Language (XML) and XML Schema Definition (XSD). A final section describes various other embodiments and manners in which the tools may act and is entitled Other Embodiments of the Tools. This overview, including these section titles and summaries, is provided for the reader's convenience and is not intended to limit the scope of the claims or the entitled sections.

Exemplary Operating Environment

Figure 1:
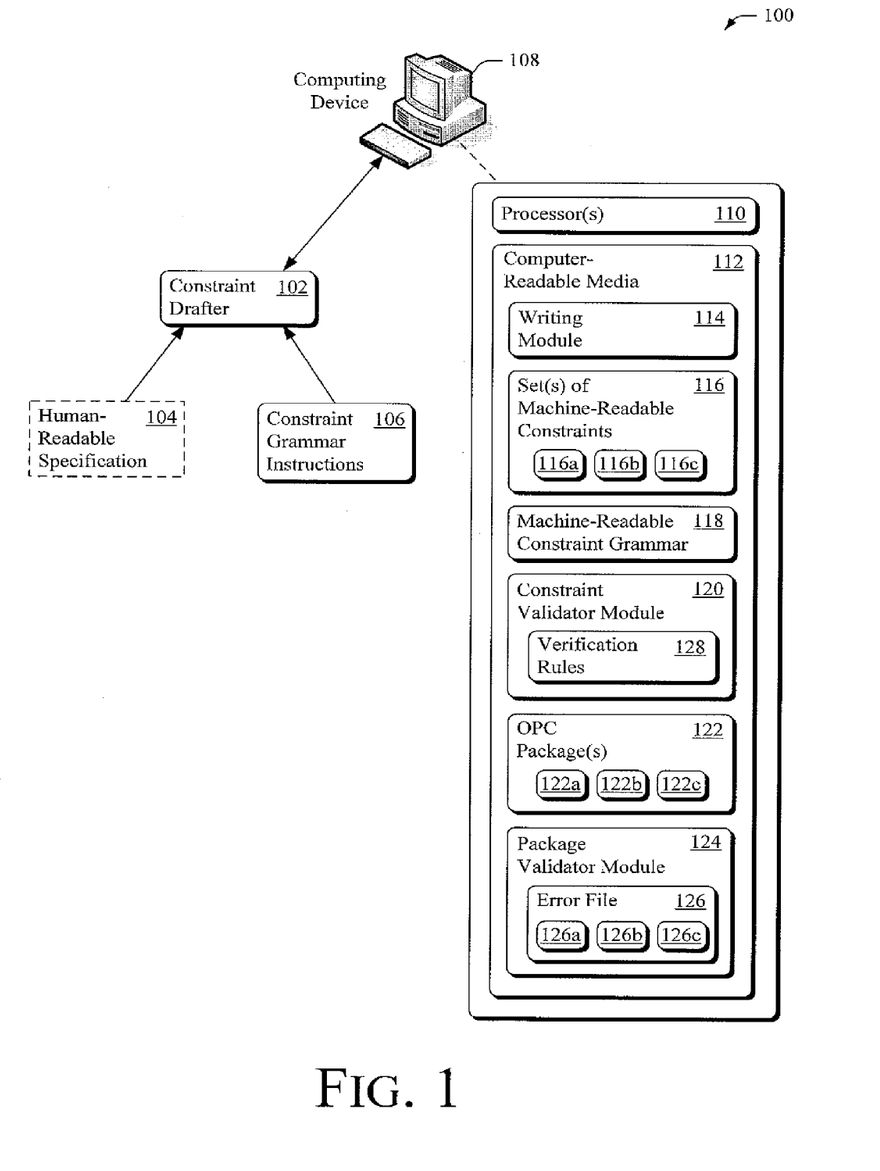
FIG. 1 illustrates an exemplary operating environment in which various embodiments of the tools may operate in the context of a computing device.

Before describing the tools in detail, the following discussion of an exemplary operating environment is provided to assist the reader in understanding some ways in which various inventive aspects of the tools may be employed. The environment described below constitutes but one example and is not intended to limit application of the tools to any one particular operating environment. Other environments may be used without departing from the spirit and scope of the claimed subject matter FIG. 1 illustrates one such operating environment generally at 100 having a constraint drafter 102, a human-readable specification 104, constraint grammar instructions 106, and a computing device 108. Communications between these entities are shown with arrows.

The constraint drafter may be a person and the constraint grammar instruction human-readable. In some cases, however, the constraint drafter is a computing entity (e.g., software) and the instructions are machine readable. The constraint drafter (if software), the constraint grammar instructions (if machine-readable), and the computing device may be integral, separate, or accessible by each other. For example, if the constraint drafter is a software module and the constraint grammar instructions are computer-readable, both the constraint drafter and the instructions may be included in the computing device.

When the constraint drafter is a person, he or she crafts constraints based on constraint grammar instructions 106 either with or without relying on human-readable specification 104. Exemplary constraint grammar instructions enabling the constraint drafter to build a set of machine-readable constraints are described in other sections below.

Computing device 108 comprises one or more processor(s) 110 and computer-readable media 112. The computing device is shown with a desktop icon, though it may comprise one or multiple computing devices of various types. The processors are capable of accessing and/or executing the computer-readable media.

The computer-readable media comprises or has access to a writing module 114, one or more sets of machine-readable constraints 116 (e.g., 116a, 116b, and 116c), machine-readable constraint grammar 118, a constraint validator module 120, one or more packages conforming to the OPC 122 (e.g., 122a, 122b, and 122c), and a package validator module 124 having one or more error files 126 (e.g., 126a, 126b, and 126c). The constraint validator module, in some embodiments, may validate constraints based on verification rules 128 in addition to machine-readable constraint grammar 118. Though these elements of the computer-readable media are described discretely, all or any subset of these elements may be combined or further separated.

The writing module enables the constraint drafter to write the set of constraints. In some embodiments described below, this writing module is an extensible Markup Language (XML) editor enabling the drafter to write the constraints in XML.

The sets of machine-readable constraints are drafted by the constraint drafter according to the constraint grammar instructions. Each of these sets of constraints should be valid against the constraint grammar and conform to verification rules (if any), both of which may be explained in the constraint grammar instructions. The machine-readable constraint grammar corresponding to these constraint grammar instructions requires that all parts of a package to be validated be reachable by a chain of Relationships. It describes the structure of a package in terms of Parts and Relationships (defined below). The machine-readable constraint grammar is readable by the constraint validator module thereby enabling the module to validate that the sets of machine-readable constraints follow the machine-readable constraint grammar. The constraint validator module may also enforce verification rules in addition to the constraint grammar.

Each of the OPC packages is a logical entity that holds a collection of Parts and Relationships. A Part comprises a stream of data (e.g., bytes) with associated Name and Content Type properties. Each Relationship represents a type of connection between a source Part and a target Part or external resource. An instance of the OPC package may or may not conform to the structure required by a particular set of machine-readable constraints.

The package validator module is capable of validating an OPC package's structure, e.g., that package constituent Parts and Relationships conform (e.g., are valid) to any one or more of the sets of machine-readable constraints. If the validator module determines that an OPC package is not valid, it may generate an error file indicating why and/or which Part or Relationship of the package is invalid.

Various exemplary and more-general manners in which each of these entities act and interact are set forth below. In the sections entitled Exemplary Constraint Grammar, Drafting Constraints, and Validating OPC Packages, particular exemplary embodiments are provided that show by way of example some of the structure and capabilities of the tools in the context of XML and XSD. In the next section, entitled Other Embodiments of the Tools, other embodiments are provided, including some that are more general than those of the prior sections.

Exemplary Constraint Grammar

This section describes how the constraint grammar may relate to other structures, grammar, and conventions on OPC packages and then provides examples of the constraint grammar in both human-readable and machine-readable forms. Constraint grammar instructions 106, for example, may be human-readable text describing what a drafter may do to build machine-readable constraints. Machine-readable constraint grammar 118 may be used to determine if a drafter's machine-readable constraints are valid. This grammar may also be human-readable as well, though in many cases constraint drafters will find it easier to learn how to write constraints based on textual instructions rather than gleaning from machine-readable constraint grammar (e.g., XSD) how constraints should be written.

Figure 2:
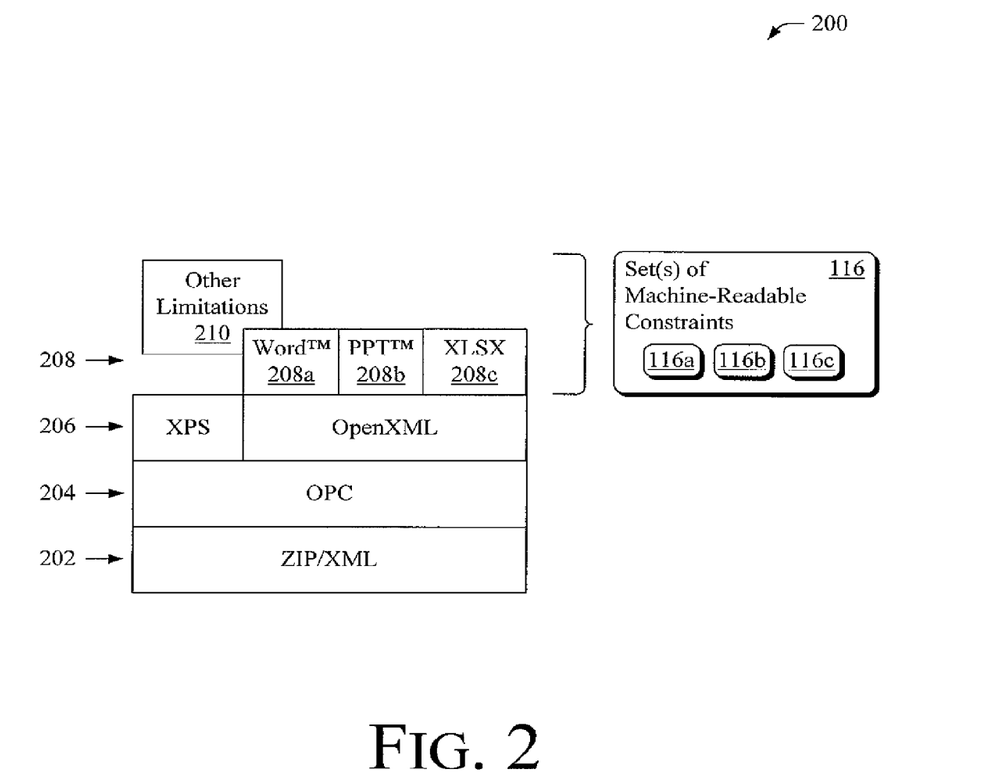
FIG. 2 illustrates an exemplary and simplified visual representation showing how constraints may relate to other structures, grammar, conventions, and/or rules often found in the field of OPC packages.

FIG. 2 sets forth an exemplary and simplified visual representation 200 of how the constraint grammar may relate to other structures, grammar, conventions, and/or rules often found in the field of OPC packages. This representation shows the most general and underlying structure as that of ZIP or XML grammar illustrated with base language grammar layer 202. On top of this layer rests the requirements of the Open Packaging Convention, OPC layer 204. The OPC layer dictates grammar and structure required in packages for them to conform to the Open Packaging Convention above that of the base language grammar layer 202.

On top of the OPC layer are other, additional requirements for packages. This secondary layer 206 may require that packages not only conform to ZIP or XML grammar and the OPC but also XPS or Office Open XML, or other grammar and structure. Further still, particular computing applications may have certain limitations on packages above that of these layers, such as those associated with various computing applications. This is illustrated with application layer 208. There may be many—if not countless—numbers of different limitations specific to different computing applications. Three types of computing-application limitations are illustrated by example in the application layer: Word™-document limitations 208a; PowerPoint™-document limitations 208b; and Excel™-document limitations 208c (labeled as XLSX, which is the extension for Excel™ Open XML Workbooks). In addition to or separate from these computing application limitations other limitations 210 may also exist, such as those that require a package to have a structure different from or more stringent than those of the computing application limitations layer 208.

Constraints conforming to machine-readable constraint grammar 118 and directed to the computing application limitations in layer 208 and/or other limitations 210 enable determination of whether particular packages are valid to these application types and/or other limitations. This is illustrated with sets of machine-readable constraints 116 in FIG. 2.

Thus, a particular set of constraints may enable validation of a package as conforming to the limitations desired for packages to be consumed by Word™ (208a). Also, a particular set of constraints may enable validation of a package as conforming to an additional limitation not required by limitations 208a, such as one requiring that a package not have a Relationship representing a comment or any track changes in a Word™ document.

Figure 3:
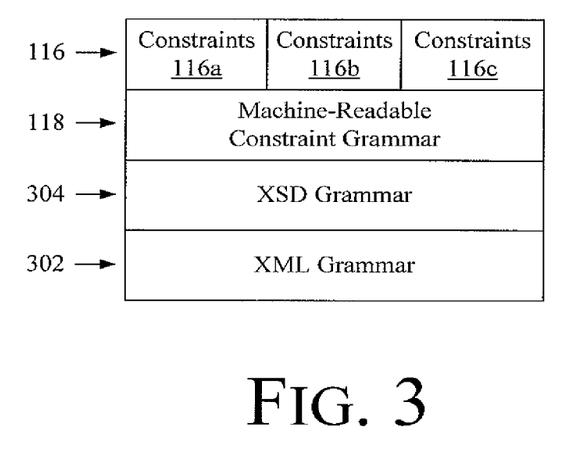
FIG. 3 illustrates reliance between exemplary constraint grammar and underlying XML and XSD grammars.

In the exemplary implementation described below, machine-readable constraint grammar 118 requires that all Parts of a package to be validated be reachable by a chain of Relationships. This machine-readable grammar may conform to XSD and XML. Each constraint of a set of constraints follows each of these and adds a requirement on a package (e.g., only one Part of a certain type, only one Relationship for a particular Part, etc.). FIG. 3 illustrates this exemplary reliance of the constraint grammar 118 by showing the constraint grammar atop an underlying XML grammar 302 and an XSD grammar 304. The machine-readable constraints 116 are shown relying on all three by lying atop the machine-readable constraint grammar.

Exemplary constraint grammar and accompanying instructions are set forth below-verification rules are addressed in more detail later in the document. The instructions may enable a constraint drafter to understand the grammar and structure required by the constraint grammar and/or the verification rules, such as Parts of a package needing to be reachable by a chain of Relationships.

These instructions inform the drafter of how to write constraints, here in XML. The accompanying XML or XSD of the constraint grammar is also provided where appropriate.

Instruction: The XML namespace for the constraint should be:

http://schemas.openxmlformats.org/package/2006/constraints

Instruction: The root Part of the constraints should be:

```
<element name="PackageConstraints"
type="pc:PackageConstraints"/>
    <complexType name="PackageConstraints">
        <sequence>
            <element ref="pc:Package" minOccurs="1" maxOccurs="1"/>
            <element ref="pc:RelationshipConstraints" minOccurs="1" maxOccurs="unbounded"/>
        </sequence>
    </complexType>
```

Instruction: There should be at least one package Relationship in the package constraints and it conform to:

```
<element name="Package" type="pc:Package"/>
    <complexType name="Package">
        <sequence>
            <element ref="pc:Relationship" minOccurs="1" maxOccurs="unbounded"/>
        </sequence>
        <attribute name="Sealed" type="boolean" use="optional" default="true"/>
        <anyAttribute namespace="##other" processContents="lax"/>
    </complexType>
```

Instruction: If a package is to be deemed invalid for having a package Relationship other than as specified by Relationship elements that are immediate children of the package element, the drafter should set a Boolean to "true" for a Sealed attribute.

Instruction: A Relationship element should be used that specifies the type and cardinality of outgoing Relationships, which can be an immediate child of the package element and of a Part element, such as:

```
<element name="Relationship" type="pc:Relationship"/>
<complexType name="Relationship">
    <simpleContent>
        <extension base="string">
            <attribute name="RelationshipType" type="anyURI" use="required"/>
            <attribute name="MinOccurs" type="nonNegativeInteger" use="optional" default="0"/>
            <attribute name="MaxOccurs" type="pc:allNNI" use="optional" default="unbounded"/>
        </extension>
    </simpleContent>
</complexType>
<simpleType name="allNNI">
    <union memberTypes="xsd:nonNegativeInteger">
        <simpleType>
            <restriction base="xsd:NMTOKEN">
                <enumeration value="unbounded"/>
            </restriction>
        </simpleType>
    </union>
</simpleType>
```

Instruction: A relationship-type attribute should be used that identifies the type of the outgoing Relationship(s). The value of the RelationshipType attribute is usable to associate the Relationship element with the RelationshipConstraints element given as examples herein.

Instruction: Optional minimum occurrence and maximum occurrence attributes specify the cardinality of the outgoing Relationship with particular relationship type. Here setting the maximum occurrence attribute to "0" prohibits the presence of such a Relationship in a package.

Instruction: A relationship-constraints element ("RelationshipConstraints") should be used that defines the pattern of Relationship targets, e.g., Parts and external resources. These elements may permit child relationship-constraint elements (e.g., nesting considered an association of Relationship and relationship constraints). One example of this grammar is:

```
<element name="RelationshipConstraints"
type="pc:RelationshipConstraints"/>
    <complexType name="RelationshipConstraints">
        <sequence>
            <choice minOccurs="1" maxOccurs="unbounded">
                <element ref="pc:Part"/>
                <element ref="pc:ExternalResource"/>
            </choice>
            <element ref="pc:RelationshipConstraints" minOccurs="0" maxOccurs="unbounded"/>
        </sequence>
        <attribute name="RelationshipType" type="anyURI" use="required"/>
        <anyAttribute namespace="##other" processContents="lax"/>
    </complexType>
```

Instruction: A relationship-type attribute ("RelationshipType") specifies the type of Relationship for any relationship-constraint elements.

Instruction: A Part element defines the Relationship's target Part's content type and wraps the set of relationship child elements and specifies the set of outgoing Relationships for the Part. An example of such is:

```
    <element name="Part" type="pc:Part"/>
    <complexType name="Part">
        <sequence>
            <element ref="pc:Relationship" minOccurs="0"
maxOccurs="unbounded"/>
        </sequence>
        <attribute name="ContentType" type="pc:ContentType"
use="required"/>
        <attribute name="Sealed" type="boolean" use="optional"
default="true"/>
        <anyAttribute namespace="##other" processContents="lax"/>
    </complexType>
    <simpleType name="ST_ContentType">
        <restriction base="string">
            <whiteSpace value="collapse"/>
            <pattern
value="((([^\p{Cc}\(\)<>@,;:\\"/\[\]\?=\{\}\s\t]+))/((([^\p{Cc}\(\)
<>@,;:\\"/\[\]\?=\{\}\s\t]+))(\s+)*;(\s+)*((([^\p{Cc}\(\)<>
@,;:\\"/\[\]\?=\{\}\s\t]+))=(([^\p{Cc}\(\)<>@,;:\\"/\[\]\?=\
{\}\s\t]+)|("((([^\p{Cc}"\n\r]|(\s+))|(\\[\p{IsBasicLatin}]))*
"))))*)"/>
        </restriction>
    </simpleType>
    <xsd:simpleType name="ContentType">
        <xsd:union memberTypes="pc:ST_ContentType">
            <xsd:simpleType>
                <xsd:restriction base="xsd:NMTOKEN">
                    <xsd:enumeration value="anyContentType"/>
                </xsd:restriction>
            </xsd:simpleType>
        </xsd:union>
    </xsd:simpleType>
```

Instruction: A content-type attribute ("ContentType") specifies the content type of the target Part. The content type should be either a keyword "anyContentType" or conform to the grammar defined for a media type in Request For Comments (RFC) 2616 related to Internet standards.

Instruction: The Sealed attribute handles the validation for packages holding Relationships that differ from those specified by the relationship elements that are immediate children of the Part element.

Instruction: The external resource element ("ExternalResource") defines the pattern of the Relationship's target external resource in the context of relationship constraints. One example of this grammar is:

```
    <element name="ExternalResource" type="pc:ExternalResource"/>
    <complexType name="ExternalResource">
        <simpleContent>
            <extension base="string"/>
        </simpleContent>
    </complexType>
```

Based on these instructions, a constraint drafter may write constraints conforming to the constraint grammar. The following section describes an example of how a constraint drafter may use these instructions to build a set of constraints.

Drafting Constraints

Figure 4:
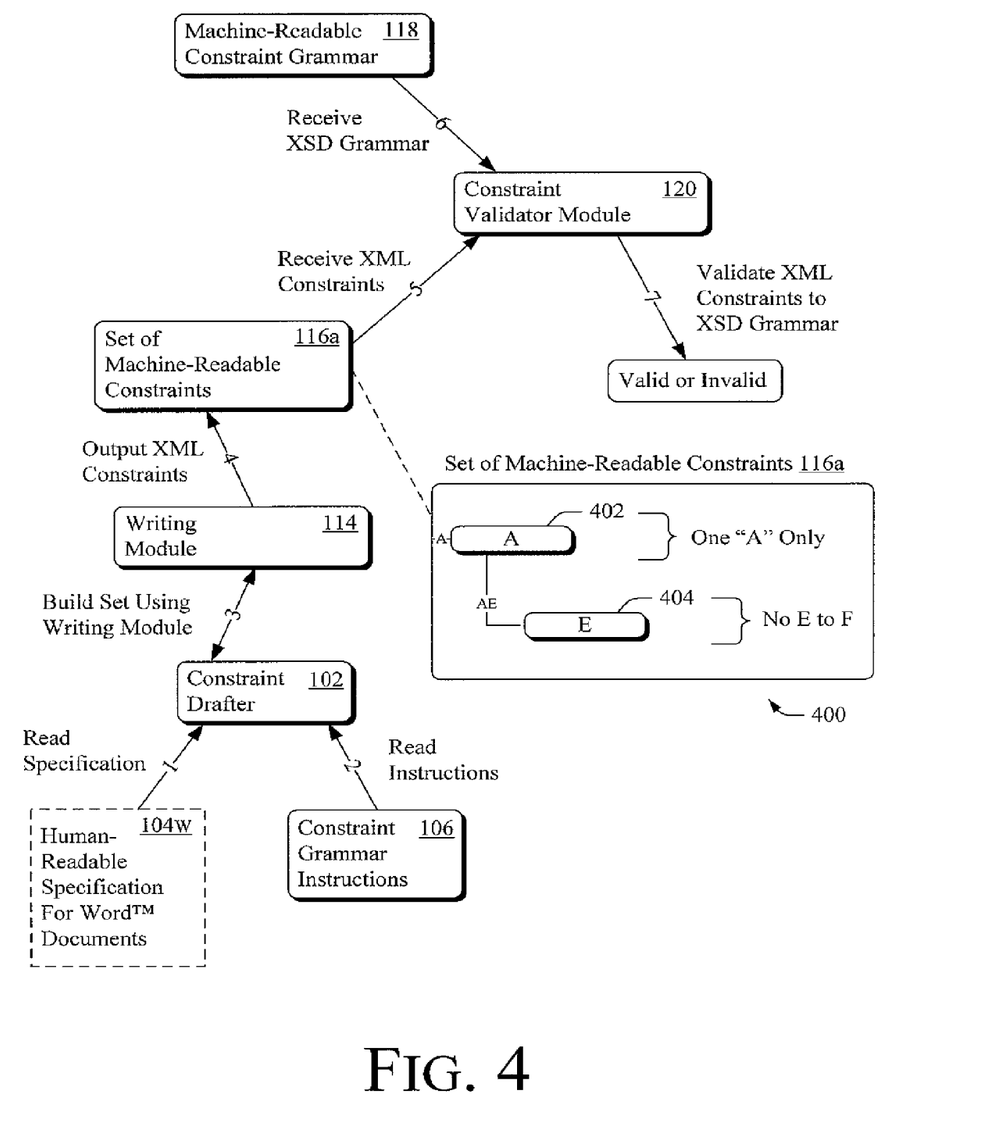
FIG. 4 illustrates exemplary actions of and interactions between elements of the tools enabling a constraint drafter to draft constraints and find out if his or her constraints are valid.

This section describes one particular example where elements of the tools, such as constraint grammar instructions 106, writing module 114, machine-readable constraint grammar 118, and constraint validator module 120, act and interact to enable constraint drafter 102 to draft constraints and find out if his or her constraints are valid. This example is an implementation of the tools—it is not intended to limit the scope of the tools or the claimed embodiments.

This example is illustrated in FIG. 4, which shows exemplary actions of and interactions between elements of the tools. This example assumes that the constraint drafter drafts a set of constraints based on desired limitations for packages to be consumed by a Word™ word-processing computing application, which we assume are based on a human-readable specification for this computing application.

At arrow 1 in FIG. 4, constraint drafter 102 reads a human-readable specification 104w setting out limitations on packages consumable by a Microsoft® Word™ computing application. This specification contains many limitations on packages but here we limit our example to a particular limitation requiring that a package have only one document root Part and another limitation not required by the specification—that the appropriate Part capable of having a Relationship indicating that the Word™ document have inserted comments (e.g., text in balloons) not have this Relationship. Because each document root Part applies to a different Word™ document, this limitation effectively requires that a package contain only one Word™ document.

At arrow 2, the constraint drafter reads constraint grammar instructions 106 to determine how to write constraints. Based on the constraint grammar instructions, the constraint drafter builds a set of machine-readable constraints 116a that enforce limitations from the human-readable specification. A constraint drafter may also require (and here does require) that a particular Part of a package have a certain number of outgoing Relationships of a certain type. The Part of a package that has a Relationship to an internal comment or track changes may be constrained to a maximum of "0" such Relationships, effectively causing any package with a document having comments or track changes to be invalid.

At arrow 3, the constraint drafter builds a set of constraints using writing module 114. This writing module here is an XML editor enabling the drafter to write XML text following XML grammar.

At arrow 4, the writing module outputs a set of machine-readable constraints 116a written in XML. The set of constraints is illustrated in a simplified form 400 in FIG. 4. Simplified constraints 400 shows two constraints, one that permits exactly one Part "A" (e.g., minimum occurrence of A=1 and maximum occurrence of A=1, first constraint 402) and one that requires that Part "E" not have a Relationship to any Parts "F" (second constraint 404). The constraints do not otherwise limit the package other than that each Part of the package to be validated should be accessible by a chain of Relationships.

The constraint validator module 120 receives these constraints at arrow 5. At arrow 6 the constraint validator module also receives the machine-readable constraint grammar, here written in XSD.

At arrow 7 the constraint validator module determines whether the XML set of constraints conforms to the XSD constraint grammar and outputs a result of valid or invalid. If valid, the set of constraints enables determination of whether packages conform to the constraints, such as automatically by package validator module 124 of FIG. 1.

As noted above, the sets of constraints should be valid against the constraint grammar and, in some cases, conform to verification rules. Some of the rules for the set of constraints may be expressed other than through machine-readable constraint grammar. In these cases, verification rules supplement the constraint grammar and may include the following four rules.

First, that sibling RelationshipConstraints elements have unique values of the RelationshipType attribute. Second, that sibling Relationship elements have unique values of the Relationship Type attributes. Third, that sibling Part elements have unique values of the ContentType attribute. Note also that there can be zero or one Part element with an anyContentType ContentType attribute value. Fourth, that each Relationship element be mapped to the RelationshipConstraints element with matching RelationshipType attribute values. RelationshipType attribute values should also be compared as case-sensitive ASCII strings in this embodiment.

Mapping, in this embodiment, may be performed as follows for a Relationship element, which is a child of a Part element, by matching RelationshipConstraints element among the siblings of the Part element. For matching a RelationshipConstraints element that is not found, this includes going up to the parent RelationshipConstraints element and doing a repeat lookup among its siblings. For matching a RelationshipConstraints element that is not found, this includes repeating the immediately prior step up to the root of the tree of nested RelationshipConstraints elements. Also, for a Relationship element that is a child of the Package element, this includes matching a RelationshipConstraints element among the siblings of the Package element.

Also by way of example, consider the following simplified example for a set of constraints for validating an OPC package that may hold a set of Parts required for a digital signature:

```
 (1) <PackageConstraints
xmlns="http://schemas.openxmlformats.org/package/2006/constraints">
 (2)    <Package Sealed="false">
 (3)      <Relationship MinOccurs="0" MaxOccurs="1"
RelationshipType="http://schemas.openxmlformats.org/package/2006/
relationships/digital-signature/origin"/>
           </Package>
 (4)    <RelationshipConstraints
RelationshipType="http://schemas.openxmlformats.org/package/2006/
relationships/digital-signature/origin">
 (5)      <Part ContentType="application/vnd.openxmlformats-
package.digital-signature-origin">
 (6)      <Relationship MinOccurs="1" MaxOccurs="unbounded"
RelationshipType="http://schemas.openxmlformats.org/package/2006/
relationships/digital-signature/signature"/>
           </Part>
```

-continued

```
         <RelationshipConstraints>
 (7)    <RelationshipConstraints
RelationshipType="http://schemas.openxmlformats.org/package/2006/
relationships/digital-signature/signature">
 (8)      <Part ContentType="application/vnd.openxmlformats-
package.digital-signature-xmlsignature+xml">
 (9)      <Relationship MinOccurs="0" MaxOccurs="1"
RelationshipType="http://schemas.openxmlformats.org/package/2006/
relationships/digital-signature/certificate"/>
           </Part>
         </RelationshipConstraints>
 (10)   <RelationshipConstraints
RelationshipType="http://schemas.openxmlformats.org/package/2006/
relationships/digital-signature/certificate">
 (11)     <Part ContentType="application/vnd.openxmlformats-
package.digital-signature-certificate"/>
         </RelationshipConstraints>
       </PackageConstraints>
```

For this set of constraints, note the following. (1) The PackageConstraints element is the root element of the Package Constraints xml document. (2) The Package element holds the Relationship element ((3)) that specifies the Package Relationship targeting the Signature Origin Part. The Sealed attribute value=false indicates that a Package, valid against the Package Constraints, may hold other Package Relationships not specified by the Package Constraints. (3) The Relationship element specifies the Package Relationship targeting the Signature Origin Part. The MinOccurs attribute value=0 specifies that the Package Relationship is optional. The MaxOccurs attribute value=1 specifies that there can be maximum one Package Relationship targeting Signature Origin Part. The RelationshipType attribute value a) specifies the Type of the Package Relationship, and b) identifies the Relationship Constraints applied to the Package Relationship's target Signature Origin Part.

Also note: (4) The RelationshipConstraints element specifies the pattern of the Package Relationship target Signature Origin Part. The RelationshipType attribute value specifies the type of the Package Relationship. (5) The Part element holds the required ContentType and optional Sealed attributes. The ContentType attribute value specifies the Content Type of the Signature Origin Part. The default value to the optional Sealed attribute (=true) indicates that the Signature Origin Part may not hold outgoing Relationships other than specified by Relationship element ((6)). (6) The Relationship element specifies the Relationships targeting Signature Parts. The MinOccurs attribute value=1 specifies that at least one Relationship is required. The MaxOccurs attribute value=unbounded specifies that there can be unlimited number of Relationships targeting Signature Parts. The RelationshipType attribute value a) specifies the Type of the Relationship, and b) identifies the Relationship Constraints applied to the Relationship's target Signature Part. (7) The RelationshipConstraints element specifies the pattern of the Relationship's target Signature Part. The RelationshipType attribute value specifies the type of the Relationship.

Further, note that: (8) The Part element holds the required ContentType and optional Sealed attributes. The ContentType attribute value specifies the Content Type of the Signature Part. The default value to the optional Sealed attribute (=true) indicates that the Signature Part may not hold outgoing Relationships other than specified by Relationship element ((9)). (9) The Relationship element specifies the Relationship targeting Certificate Part. The MinOccurs attribute value=0 specifies that the Relationship is optional. The MaxOccurs attribute value=1 specifies that there can be maximum one Relationship targeting Certificate Part. The RelationshipType attribute value 1) specifies the Type of the Relationship, and 2) identifies the Relationship Constraints applied to the Relationship's target Certificate Part. (10) The RelationshipConstraints element specifies the pattern of the Relationship's target Certificate Part. The RelationshipType attribute value specifies the type of the Relationship. (11) The Part element holds the required ContentType and optional Sealed attributes. The ContentType attribute value specifies the Content Type of the Certificate Part. The default value to the optional Sealed attribute (=true) indicates that the Certificate Part may not hold outgoing Relationships.

Validating OPC Packages

This section describes one particular example where elements of the tools, such as a set of machine-readable constraints 116a and package validator module 124 act and interact to validate that a package's structure meets these constraints.

Figure 5:
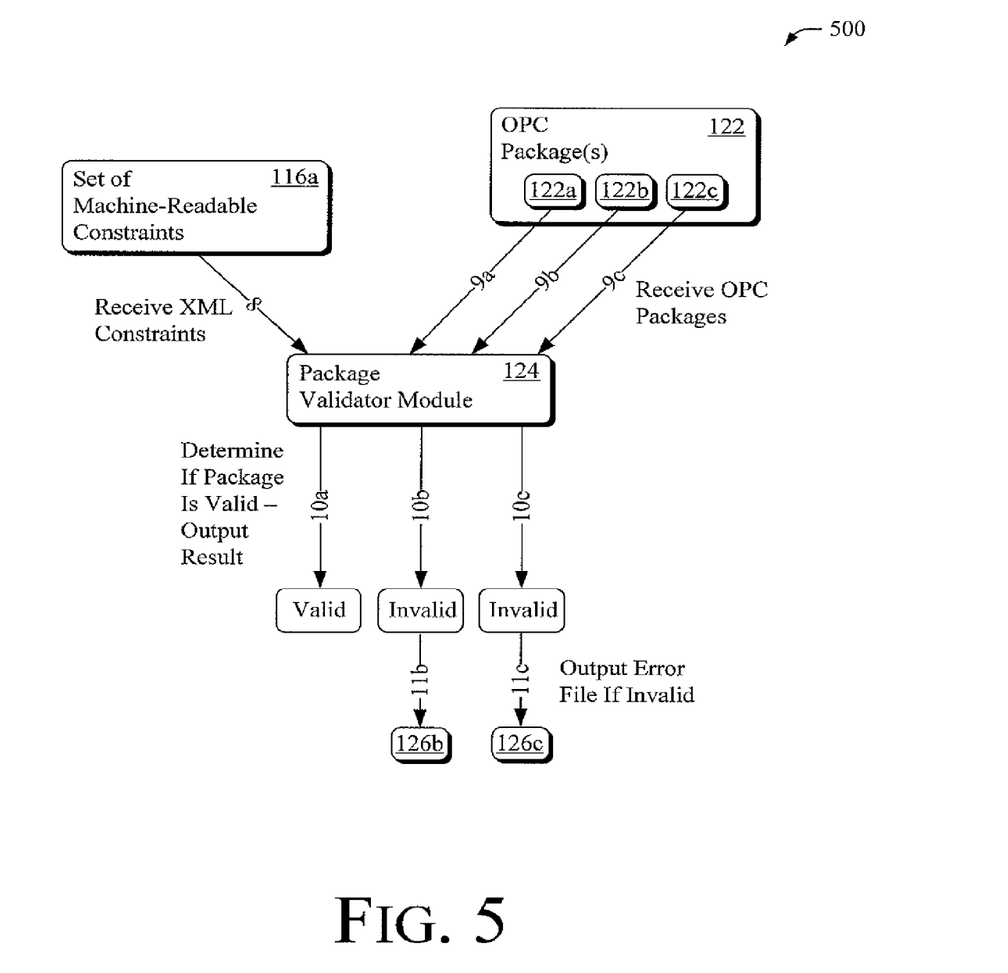
FIG. 5 illustrates exemplary actions of and interactions between elements of the tools enabling determination that a package's structure is valid according to a set of machine-readable constraints.

This example is illustrated in FIG. 5, and assumes that the set of machine-readable constraints is based on desired limitations for packages to be consumed by a Word™ word-processing computing application and continues one of the above examples (i.e., using constraints 116a of FIG. 4).

At arrow 8, the package validator module receives the set of machine-readable constraints built in FIG. 4. This set of constraints requires that a package have only one root Part for one document and not permit a particular Relationship between Parts E and F. The package validator module also receives OPC packages, here 122a, 122b, and 122c.

At arrow 10, the package validator module determines if each of the packages is valid and outputs a result. As noted above, the package validator is capable of validating that a package is valid according to a set of constraints.

Figure 6:
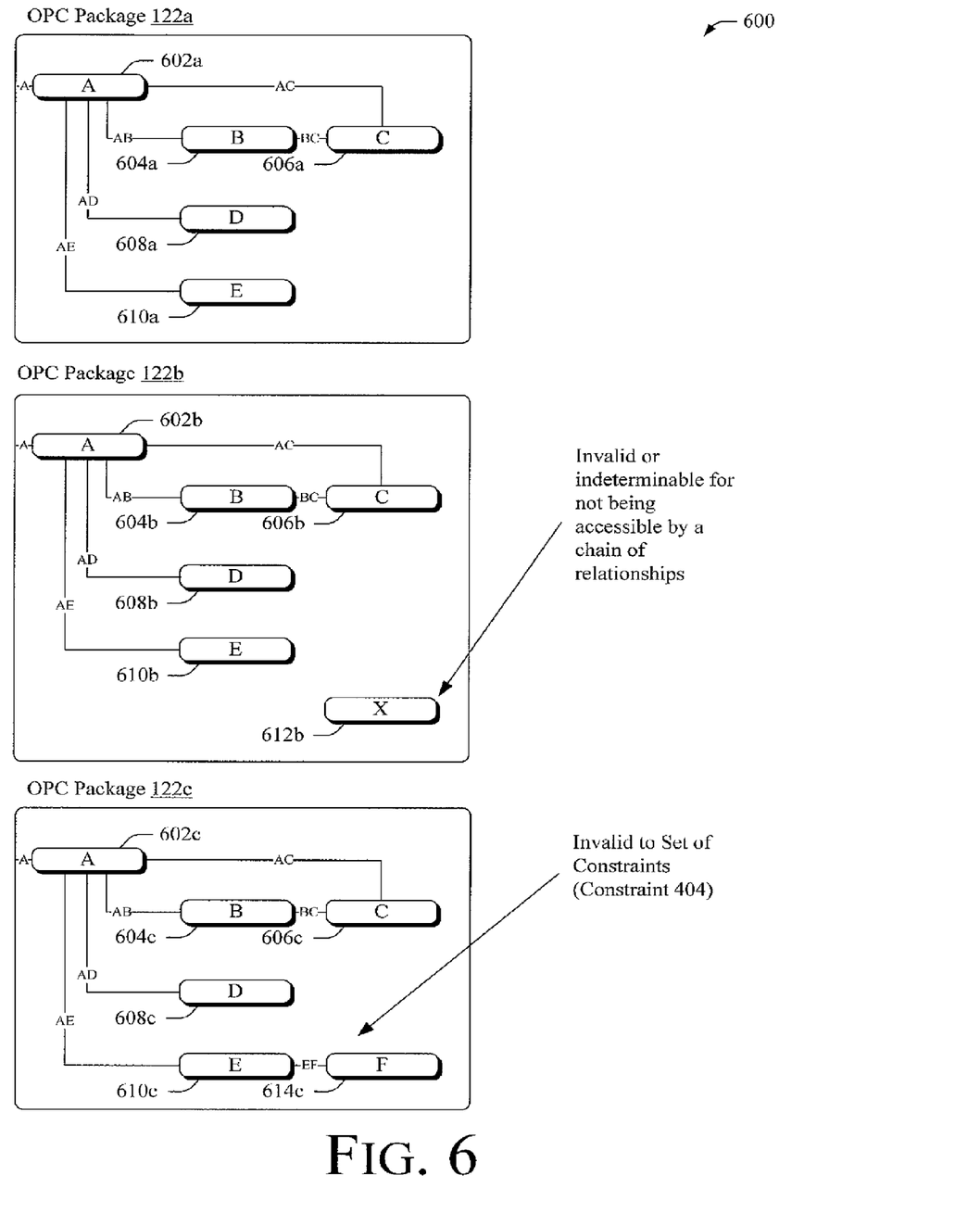
FIG. 6 illustrates an exemplary and simplified structure for three OPC packages.

To aid the reader in understanding the structure of the OPC packages, FIG. 6 illustrates a simplified structure for each of the packages 122a, 122b, and 122c. Package 122a contains a Relationship "A" and a Part A 602a, a Part B 604a having a Relationship to A of "AB" and a Relationship to Part C 606c of "BC". Part A also has a Relationship to Part C of "AC". Part A has a Relationship "AD" to Part D 608a and "AE" to Part E 610a. Package 122b is slightly different, it comprises all of the Parts and Relationships of package 122a (each lower-case "a" marked instead with a "b") but also contains a Part X 612b that does not have any Relationships. Package 122c is identical to 122a except that Part E 610c has a Relationship "EF" to a new Part F 614c.

Returning to FIG. 5, at arrow 10 the package validator module determines if each package is valid. Here the set of constraints as illustrated in FIG. 4 permits exactly one relationship target—Part A. As is visually apparent in FIG. 6, all three packages are valid for this constraint.

For the second constraint, namely that any Part E (if present) may not have a Relationship to a Part F, the OPC package 122c is not valid. In determining the package's validity or invalidity against all of the set of constraints, the validator module analyzes, for OPC package 122c, first Part A and Relationship A against the constraint that there by one and only one relationship target—Part A (see 402 of FIG. 4). Then the validator module analyzes Part A's Relationships AB and AC against both constraints 402 and 404, and so forth until the validator module analyzes, through the chain of Relationships A to Part A and Relationship AE to Part E that Part E has a Relationship EF to Part F. This Relationship EF is not valid based on the constraint 404 prohibiting a Relationship between E and F.

Therefore, the package validator module outputs that package 122c is not valid. It may output an error file at arrow 11c indicating why the package is invalid (because it has a Relationship "EF" indicating that the document of the package has internal comments).

For the general requirement that all Parts to be validated be accessible by a chain of Relationships, the validator module determines that Part X 612b of package 122b contains a Part that is not accessible by a chain of Relationships. At this point the validator may invalidate the entire package or validate only the Parts and Relationships that are accessible (everything else in package 122b). Here the validator indicates at arrow 11b that the package is invalid because it contains Parts not accessible by a chain of Relationships.

Having presented a simplified example, the discussion turns to an exemplary manner in which packages may be validated. First, for each Relationship element, which is a child of Package element, there should be the set (possibly empty set) of Package Relationships with matching Relationship Type values. Relationship Type values should be compared as case-sensitive ASCII strings. Cardinality of the set should conform to the MinOccurs and MaxOccurs attributes values of the Relationship element. Second, if the Sealed attribute value of the Package element is true, there should not be Package Relationships which do not match a Relationship element—child of the Package element. Third, for each Package Relationship associated with the Relationship element, its target should conform to the restrictions defined by the RelationshipConstraints element mapped to the Relationship element. Fourth, target Part's Content Type should match the ContentType attribute value of a Part child element of the RelationshipConstraints element: if there is a Part element with the ContentType attribute value conforming to media type grammar that matches the Part's Content type, the Part element should be taken as matching; and if there is no Part element with the ContentType attribute media type value matching the Part's Content Type, and there is a Part element with the ContentType attribute value="anyContentType" keyword, the Part element should be taken as matching. Fifth, for each Relationship element, which is a child of the Part element, the target Part should have the set (possibly empty set) of outgoing Relationships with matching Relationship Type values. Cardinality of the set should conform to the MinOccurs and MaxOccurs attributes values of the Relationship element. Sixth, if the Sealed attribute value of the Part element is true, there should not be outgoing Relationships which do not match a Relationship element—child of the Part element. Seventh, for each outgoing Relationship associated with the Relationship element, its target should conform to the restrictions defined by the RelationshipConstraints element mapped to the Relationship element. Note that the operations four through seven should be applied recursively to all accessible Relationships in the Package.

Other Embodiments of the Tools

The above sections describe particular examples of the tools in the context of XML and XSD. In this section, other embodiments of the tools are described, some of which rely on XML and XSD and some of which do not.

Figure 7:
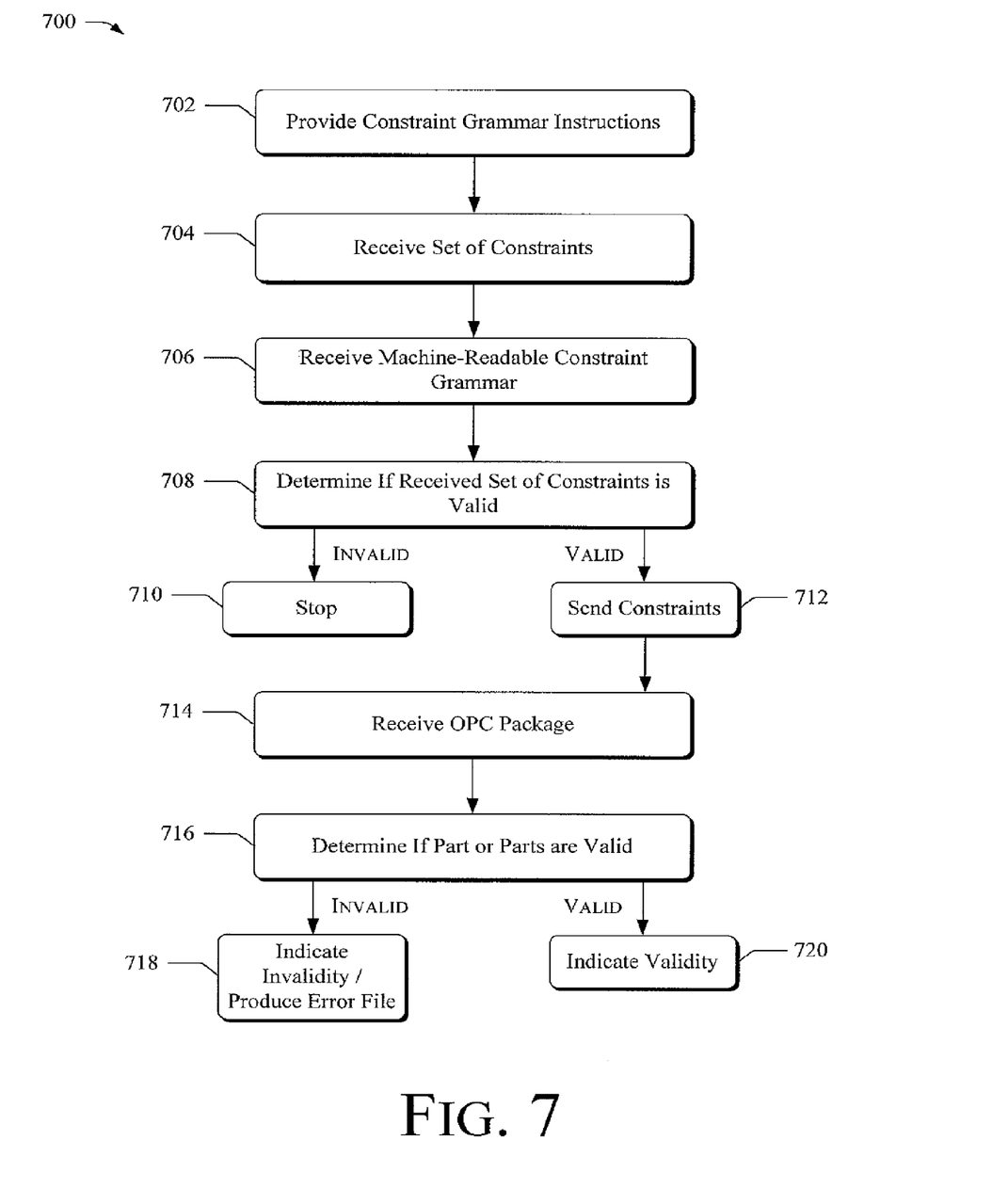
FIG. 7 is an exemplary process illustrating some ways in which the tools may act to validate and enabling validation of a package's structure, as well as other actions.

These exemplary embodiments are described as part of process 700 of FIG. 7. This process and the exemplary actions, interactions, and/or processes described or illustrated in FIGS. 4 and 5 may be implemented in any suitable hardware, software, firmware, or combination thereof; in the case of software and firmware, these processes represent sets of operations implemented as computer-executable instructions stored in computer-readable media and executable by one or more processors. These embodiments of the tools described in this section are not intended to limit the scope of the tools or the claims.

Block 702 provides constraint grammar instructions, such as to a person desiring to craft constraints for OPC packages. These instructions may include human-readable text explaining how to write constraints in a form that is machine-readable (e.g., XML, C++, script, or a non-XML markup language). Examples of these are provided above in the context of XML.

In some cases, however, these instructions may explain to a person how to build constraints in a format capable, in manners well-known in the art, of being converted into a machine-readable form. A person may, for example, build constraints graphically and have those constraints converted. In still other cases, the instructions may indicate to an application or other set of computer-executable instructions how to build constraints conforming to constraint grammar, such as the exemplary XML constraint grammar provided above.

In the above example a person reads constraint grammar instructions for writing constraints in XML. The person then writes the constraints based on a human-readable specification for the particular type of computing application that the person wants his or her packages to conform. Note that this example was simplified to require that just a single Part A be included. The person also writes an additional constraint not required by the human-readable specification for that computing application, here that no EF Relationship exist. This constraint is effective, for any OPC packages having a Word™ document having comments or track changes, to cause the package to be determined invalid. This may be desirable if a company wants to ensure that no documents distributed to persons outside of the company (e.g., by email) will be able to see comments and track changes.

This particular example is used to illustrate a particular application of the tools though many others may also be used. For example, if a person wants to ensure that certain packages conform to the structure required by the European Computer Manufacturers Association International (ECMA or Ecma International) that person may, based on the constraint grammar or the constraint grammar instructions, build a set of constraints that permit only ECMA-structured OPC packages to be considered valid. Note that an ECMA-structure package may be consumable by and desirable for many different computing applications.

These constraints may also be useful for automatically generated or annotated OPC packages, many of which may have a structure that is unacceptable or otherwise may cause problems for a computing application that is intended to consume that package. In the field of workflow management, for example, OPC packages may automatically be annotated with workflow information. These constraints enable automated validation of these packages, thereby permitting an entirely automated creation/annotation of OPC packages having a structure known to be consumable by its computing application.

Block 704 receives a set of constraints in machine-readable form. Block 704 may receive constraints in a mark-up language or any other machine-readable format (e.g., C++, script, XML, and a non-XML markup language). In the above example illustrated in FIG. 4 (see 116a), the set of constraints are in machine-readable XML and require that an OPC package have only one "A" Part and no "EF" Relationships.

Block 706 receives machine-readable constraint grammar. In cases where the tools determine if a set of constraints are valid before using them to validate OPC packages, the constraint grammar to which the constraints should conform may be received. In the above example, constraint validator module 120 receives machine-readable constraint grammar in XSD for constraints written in XML.

Block 708 determines whether or not a set of machine-readable constraints is of an appropriate format (e.g., valid) for use to validate an OPC package. The tools read the machine-readable constraint grammar and, based on this grammar, determine if the set of constraints conform to this constraint grammar. In the above example the XML constraints are automatically validated (or invalidated) based on XSD constraint grammar and verification rules. If block 708 determines that the set of constraint are invalid it proceeds to block 710 and stops. In some alternatives, however, the tools (e.g., the constraint validator module of FIGS. 1 and 4) fix the constraints or indicate how the set of constraints is invalid.

If block 708 determines that the received set of constraints is valid, it proceeds to block 712. At block 712 the tools may send the constraints to a module capable of validating packages based on the constraints or, if the tools are arranged such that validation of constraints and validation of packages are performed by a single entity, the tools need not send the constraints. In the above example, for instance, the validator module receives the validated set of constraints 116a from the constraint validator module at arrow 8 in FIG. 5.

Block 714 receives an OPC package or a package that is capable of conforming to OPC after further processing. This package may have first been determined to conform to OPC and XML, ZIP, Office Open XML or other structure or grammar prior to being received. The OPC packages 122 of FIG. 5 in the above example conform to ZIP or XML, OPC, and Office Open XML grammars as illustrated in FIG. 2. In cases where a package does not conform to OPC but is capable of being processed to do so, the tools process the package to produce an OPC-Compliant package. One example of this is where a package has hidden or implicit relationships. This processing may make these relationships explicit, thereby enabling the package to conform to OPC prior to the package being addressed at block 716.

Block 716 determines if the received OPC package is valid according to the set of one or more constraints. The tools may analyze each Part and its Relationships through a chain of Relationships. The tools may analyze all Parts and their Relationships through a root Part and so forth until every Part reachable by a chain of Relationships is analyzed. Each Part and Relationship is then compared to the constraints on that Part and its Relationships to determine if it conforms to the machine-readable set of constraints. Examples of this process are provided above.

If block 716 determines that something is invalid, it proceeds to block 718. Block 718 may indicate that the particular Part and/or Relationship is invalid, to which constraint of the set of constraints, and why in an error file. Or it may indicate simply that the package as a whole is invalid or anything in between. If block 716 determines that the OPC package is valid, it proceeds to block 720 and indicates this validity.

This process 700 may be largely or entirely automated. The tools, for example, may receive a set of constraints at block 704, constraint grammar at 706, and then automatically determine the validity of the constraints. The tools may also, based on these constraints, automatically and without user interaction determine the validity or invalidity of an arbitrary number of OPC packages based on this set of constraints. Portions or all of process 700 may also be integrated with other processes, such as those that create or annotate OPC packages (e.g., the workflow example given above) effective to generate OPC packages known to be valid. These packages, once known to be valid to a particular structure as set forth in a set of constraints, may then be distributed to computing applications with a higher degree of confidence that the structure of those packages will be consumable by their appropriate computing applications.

Conclusion

The above-described tools are capable of validating and/or enabling validation of a package's structure. By so doing, the tools may enable package drafters to forgo time-consuming and unreliable processes for finding structural defects or inconsistencies in OPC packages. The tools may also enable validation of OPC packages for additional structural limitations, such as indicating that an OPC package for a word-processing document contains embedded comments or some other aspect that someone would like to detect. Although the tools have been described in language specific to structural features and/or methodological acts, it is to be understood that the tools defined in the appended claims are not necessarily limited to the specific features or acts described. Rather, the specific features and acts are disclosed as exemplary forms of implementing the tools.

The invention claimed is:

1. One or more tangible computer-readable storage devices having computer-readable instructions stored therein that, when executed by a computing device, cause the computing device to perform acts comprising:
  receiving a set of one or more constraints for Open Packaging Convention (OPC) package validation;
  receiving constraint grammar, the constraint grammar including application-specific limitations on OPC packages;
  comparing the set of one or more constraints with the constraint grammar to determine whether the set of one or more constraints conforms to the constraint grammar;
  receiving a package;
  identifying one or more parts of the package, wherein each part of the one or more parts is reachable by a chain of relationships;
  determining, without user interaction, whether the one or more parts and their relationships conform to the set of one or more constraints; and
    if any of the one or more parts or their relationships do not conform to the set of one or more constraints, providing data identifying the one or more parts or their relationships that do not conform to the set of one or more constraints; and
    if the one or more parts and their relationships conform to the set of one or more constraints, distributing the package to one or more computing applications.

2. The one or more tangible computer-readable storage devices of claim 1, wherein the constraint grammar further comprises eXtensible Markup Language (XML) grammar.

3. The one or more tangible computer-readable storage devices of claim 1, wherein the determining further comprises determining that one or more parts and their relationships conform to the set of one or more constraints if sibling elements associated with constraints on a relationship in the package which follows the OPC include unique values for their attributes identifying relationship types.

4. The one or more tangible computer-readable storage devices of claim 1, wherein each part of the one or more parts is reachable by chains of relationships starting at a root part of the package and ending at the one or more parts.

5. The one or more tangible computer-readable storage devices of claim 1, wherein the determining further comprises determining that the package does not conform to the set of one or more constraints if any of the one or more parts or their relationships do not conform to the set of one or more constraints.

6. The one or more tangible computer-readable storage devices of claim 1, wherein the providing the data identifying the one or more parts or their relationships that do not conform to the set of one or more constraints further comprises identifying which constraint of the one or more constraints the one or more parts or their relationships are determined to not conform.

7. A method implemented at least in part by a computing device, the method comprising:
  enabling a constraint drafter to build a set of one or more constraints based upon one or more constraint grammar instructions, wherein:
    the one or more constraint grammar instructions informs the constraint drafter how to write the set of one or more constraints for validating an Open Packaging Convention (OPC) package, and
    the one or more constraint grammar instructions include application-specific limitations on OPC packages;
  comparing the set of one or more constraints with the one or more constraint grammar instructions to determine whether the set of one or more constraints conforms to the one or more constraint grammar instructions;
  receiving an OPC package having one or more parts to be validated, wherein each of the one or more parts of the OPC package is reachable by a chain of relationships;
  identifying one or more parts of the package, wherein each part of the one or more parts is reachable by a chain of relationships;
  determining whether the one or more parts of the OPC package and their relationships conform to the set of one or more constraints; and
    if any of the one or more parts or their relationships do not conform to the set of one or more constraints, determining that the structure of the OPC package is invalid and providing data identifying the one or more parts or their relationships that do not conform to the set of one or more constraints; and
    if the one or more parts and their relationships conform to the set of one or more constraints, determining that the structure of the OPC package is valid and distributing the package to one or more computing applications.

8. The method of claim 7, wherein the enabling provides human-readable text indicating how to build machine-readable constraints.

9. The method of claim 8, wherein the human-readable text further indicates how to write the machine-readable constraints in eXtensible Markup Language (XML) conforming to the one or more constraint grammar instructions in XML Schema Definition (XSD).

10. The method of claim 7, wherein the set of one or more constraints conforms to eXtensible Markup Language (XML) grammar.

11. The method of claim 10, wherein the one or more constraint grammar instructions conform to XML Schema Definition (XSD).

12. The method of claim 7, further comprising validating that the set of one or more constraints follows verification rules that sibling elements associated with constraints on a relationship in the OPC package have unique values for their relationship type attributes.

13. The method of claim 7, wherein if any of the one or more parts or their relationships do not conform to the set of one or more constraints, further providing an error file indicating why the one or more parts or relationships do not conform and indicating one or more constraints that are associated with the determining that the one or more parts or relationships do not conform.

14. The method of claim 7, further comprising providing human-readable text describing how to build constraints conforming to the one or more constraint grammar instructions and one or more verification rules.

15. One or more tangible computer-readable storage devices having computer-readable instructions stored thereon, that when executed by a computing device, enable the computing device to perform acts comprising:
   receiving a set of constraints for an Open Packaging Convention (OPC) package wherein the set of constraints requires each part of the OPC package be reachable by a chain of relationships;
   receiving constraint grammar comprising multiple layers, including a layer for application-specific limitations on OPC packages;
   comparing the set of constraints with the constraint grammar to determine whether the set of constraints conforms to the constraint grammar;
   receiving the OPC package including one or more parts;
   identifying one or more parts of the package, wherein each part of the one or more parts is reachable by a chain of relationships; and
   automatically determining whether each part of the one or more parts is reachable by the chain of relationships and whether the one or more parts of the OPC package conform to the set of constraints; and
   if each part is reachable by the chain of relationships and the one or more parts conform to the set of constraints, distributing the OPC package to one or more computing applications.

16. The one or more tangible computer-readable storage devices of claim 15, wherein the constraint grammar is one of an eXtensible Markup Language (XML) grammar and an XML Schema Definition (XSD) grammar indicating that the one or more parts of the OPC package are reachable by a chain of relationships.

17. The one or more tangible computer-readable storage devices of claim 15, wherein the set of constraints further follows rules that sibling elements associated with constraints on a relationship in the OPC package have unique values of their relationship type attributes.

18. The one or more tangible computer-readable storage devices of claim 15, wherein the set of constraints comprises a set of computer generated constraints.

19. The one or more tangible computer-readable storage devices of claim 15, wherein the multiple layers further include an OPC requirements layer and an XML Paper Specification (XPS) layer.

20. The one or more tangible computer-readable storage devices of claim 15, wherein the acts further comprise, if any of the one or more parts or their relationships do not conform to the set of constraints, providing data identifying the one or more parts or their relationships that do not conform to the set of computer generated constraints.

\* \* \* \* \*